Sept. 25, 1962 H. HARRISON ETAL 3,055,654
SCREW CLAMP
Filed Feb. 3, 1960

INVENTORS
HENRY HARRISON
HENRY C. HARRISON

BY Cushman, Darby & Cushman
ATTORNEYS

United States Patent Office 3,055,654
Patented Sept. 25, 1962

3,055,654
SCREW CLAMP
Henry Harrison, Box 117, Locust Valley, N.Y., and Henry C. Harrison, 94 Bayview Ave., Port Washington, N.Y.
Filed Feb. 3, 1960, Ser. No. 6,437
5 Claims. (Cl. 269—241)

This invention relates to an improved form of cooperating thread means, and to improved clamping devices incorporating such cooperating thread means.

Cooperating thread means on two components, one of which is moveable with respect to the other, have been used in various types of mechanical devices so as to provide for adjustment of the moveable component upon rotation thereof about the longitudinal axis of the cooperating thread means. However, cooperating screw threads serve other purposes than merely that of providing adjustment. For example, in many clamping devices such as C-clamps, nutcrackers, vices or the like, cooperating screw threads are used for obtaining (a) adjustment, (b) mechanical force advantage, and (c) irreversible holding. The proportions of simple cooperating threads which are particularly suited to one of these functions, are quite different than the proportions particularly suited to another of the functions.

More specifically, cooperating screw threads which are especially suited for high mechanical force advantage and good irreversible holding are proportioned such that the thread has a low helix angle and the thread faces make a correspondingly low angle with respect to the longitudinal thread axis of the component in any given cross-section. Because of the low helix angle, the distance moved by one component with respect to the other along such axis in one revolution, the pitch, is small. On the other hand, cooperating screw threads which provide for rapid movement of one component with respect to the other have a high helix angle and the thread faces make a correspondingly high angle with respect to the longitudinal thread axis of the component in any given cross-section. Because of the high helix angle, the distance moved by one component with respect to the other along such axis in one revolution, the pitch, is high.

In view of the characteristics of different cooperating thread designs as set forth above, prior art devices have generally incorporated cooperating screw threads which have a compromise helix angle, and thread faces disposed at some compromise angle with respect to the thread axis so that adjustment, mechanical force advantage, and holding are all less efficient than desired, but each function is satisfied to a limited extent.

A primary object of the present invention is to eliminate the necessity of compromise as described above by providing improved cooperating screw threads which allow for efficient rapid adjustment and also maximum mechanical force advantage and efficient irreversible holding.

Another, and further, primary object of the present invention is to provide a clamping device incorporating the improved cooperating thread means, and so constructed (a) that a single twisting hand motion can advance a clamping member a substantial distance into engagement with a work piece and produce a high clamping force; (b) that the clamping force remains exerted upon the work piece because of the efficient irreversible holding characteristics of the clamping device; and (c) that a single reverse twisting hand motion can disengage the clamping member from the work piece and withdraw such member a substantial distance. More particularly, a further primary object of this invention is to provide a clamping device having at least one clamping member adapted to be moved into and out of engagement with an article, and including a frame, a hub coupled to the frame and having a bore extending therethrough, a tubular member with an internal channel therein, and a shaft, wherein the tubular member and the bore in the hub have cooperating thread means for rapid movement of the tubular member through the bore upon rotation of the tubular member about the longitudinal axis thereof when the tubular member is urged in one direction along such axis and for comparatively resisting movement of the tubular member along the axis when the tubular member is urged in the opposite direction, and wherein at least a portion of the shaft is carried in the tubular member, cooperates with internal threads thereon, and serves to (a) act through a torque transmitting means to rotate the tubular member and (b) provide final clamping force by cooperation with the internal threads of the tubular member.

In accordance with the preferred embodiments of the invention, the improved cooperating thread means are helical screw threads having a high helix angle and having their forward thread faces more steeply sloped than their trailing thread faces. With such construction, one member carrying such threads can be moved rapidly and easily with respect to another cooperating member when the forward faces of cooperating threads are in engagement, and reverse turning movement between the members is effectively resisted when the trailing faces of cooperating threads are in engagement.

According to a specific preferred embodiment of the invention, such cooperating threads are incorporated in a clamping device whereby a clamping member can be easily positioned and readily clamped into tight engagement with a work piece. Moreover, the invention provides improved means for securing the clamping member to an arm provided with the improved threads.

The invention will be better understood, and objects other than those specifically set forth above, will become apparent when consideration is given to the following detailed description of the invention. Such description refers to the exemplary preferred embodiments of the invention presented in the annexed drawings, wherein.

Figure 1:
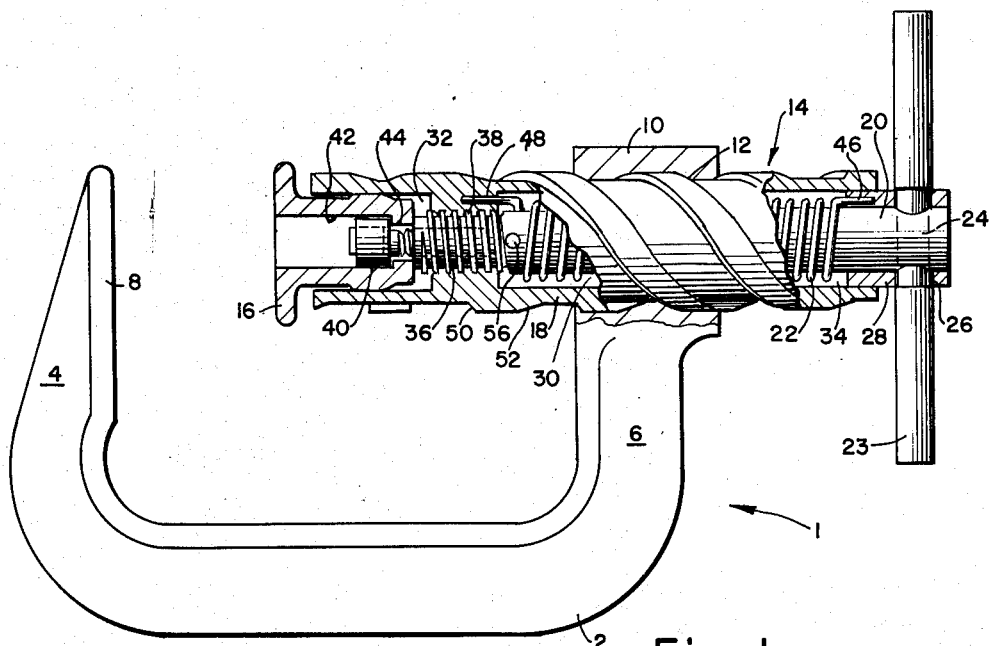
FIGURE 1 is a side view partially broken away, and partially in section, showing a C-clamp incorporating the improved cooperating thread means and otherwise constructed in accordance with the teachings of this invention.

In FIGURE 1, the numeral 1 generally designates a C-clamp which is used herein to illustrate the manner in which the invention operates. It should be understood at the outset, however, that the invention is not limited to the particular type of clamping device shown, and can be applied, as will become apparent hereinafter, to various arrangements in which screw adjustment is incorporated.

The C-clamp 1 comprises a frame 2 having arms 4 and 6. Arm 4 carries at its upper end one clamping member, namely the clamp shoe 8, and arm 6 carries at its upper end a hub member 10 having a bore 12 extending therethrough. An arm 14 cooperates with the bore 12 as hereinbelow explained, and carries at its forward end a second clamping member in the form of a clamp foot 16 which is movable toward and away from the clamp shoe 8 so that a work piece can be clamped between the shoe 8 and foot 16.

The arm 14 comprises an outer tubular member 18, a shaft 20 extending within the tubular member and coupled to foot 16, and means in the form of a spring 22, for transmitting torque between the shaft and tubular member. A handle 23 extends through a bore 24 in shaft 20 as well as a bore 26 in a collar member 28, so that rotation of handle 23 results in rotation of shaft 20. The spring 22 surrounds the shaft and is coupled between the collar 28 and the tubular member whereby rotation of the shaft results in rotation of the tubular member. The detailed construction of the shaft and interior channel in the tubular member will be considered in more detail hereinafter and it is sufficient at this point to understand that rotation of handle 23 results in rotation of the tubular member 18.

Figure 2:
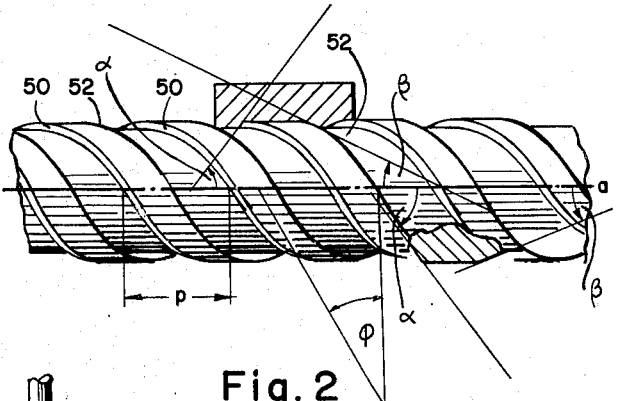
FIGURE 2 is a fragmental detailed view of the components of the C-clamp shown in FIGURE 1 which carry the improved cooperating thread means, and presents schematically the angular relationships existing in the improved thread means.

The outer surface or periphery of the tubular member 18 and the bore 12 in the hub member carry the improved cooperating thread means provided by this invention. As shown in FIGURE 2 the threads have a comparatively large helix angle $\phi$, and thus one revolution of the tubular member about the longitudinal axis $a$—$a$ thereof results in movement of the tubular member through a substantial distance $p$ equal to the pitch of the threads. The threads have forward faces 50 and trailing faces 52. The forward faces 50 slope at a comparatively steep angle $\alpha$ with respect to the longitudinal axis $a$—$a$ in any given longitudinal section and the trailing faces 52 slope at a comparatively small angle $\beta$ with respect to the longitudinal axis $a$—$a$ of the arm in any given longitudinal section. Although the axis $a$—$a$ has been described hereinabove as the longitudinal axis of the arm, it can equally well be termed the longitudinal thread axis.

Thre threads on the periphery of the tubular member 18 and bore of the hub member 10 cooperate to provide for movement of the tubular member within the bore and toward and away from the clamp shoe 8. When the tubular member is urged forward and rotated, the forward steeply sloping efficient cooperating thread faces 50—50 are in engagement, and thus rapid adjustment results. When, however, a work piece is engaged between the clamp shoe 8 and clamp foot 16, then the tubular member is urged rearwardly and the gradually sloped inefficient trailing thread faces 52—52 are in engagement and the resistance to movement of the tubular member increases. Final clamping pressure is applied by means of shaft 20 by virtue of its cooperation with the tubular member as explained below.

As shown in FIGURE 1, the tubular member 18 has an interior channel 30 which is formed by bores 32 and 34 communicating with either end of the tubular member and smaller intermediate threaded bore 36. Shaft 20 extends within bore 34 and carries at its forward end threads 38 cooperating with the threads on smaller intermediate bore 36.

The clamp foot 16 has a central bore therein which terminates above an aperture 44 in the base of the foot. A foot retaining lug 40 passes through the aperture 44 and into a threaded bore in the forward end of shaft 20 to couple the clamp foot to the shaft so that the foot is moveable with the shaft but the shaft can be rotated without rotating the foot.

As suggested hereinabove, a collar member 28 rotatable with shaft 20 serves to support the end of shaft 20, extending beyond bore 34. Coupled between this collar and the tubular member 18 is a spring 22 which has one end secured within a recess 46 in the collar 28 and the other end secured within a recess 48 in the wall of the tubular member adjacent bore 36. Cooperating with the end of spring 22 coupled with the tubular member is a stop pin 56 carried by shaft 20, which pin serves to limit rotation of the shaft to a little less than one revolution.

Having thus set forth the preferred construction of the components of the clamping device presented for illustrative purposes, operation thereof can be fully considered. Assume the clamp to be open, and it is desired to engage an article between the clamp foot and clamp shoe. The handle 23 is urged forward, i.e. in the direction of shoe 8, and twisted, in the construction shown, to the right. The resultant torque applied to the shaft 20 and collar 28 is transmitted to the tubular member by the helical torsion spring 22. As long as the clamp foot 16 is not engaging the article to be clamped, the tubular member moves forward, screw fashion, bearing on its forward steeply sloped efficient helical thread faces 50—50. When the clamp foot 16 engages the work, the axial thrust exerted by the user in urging the handle forward is canceled by the reaction pressure of the work, and further twisting of the handle turns the tubular member so that it bears on its inefficient gradually sloped trailing wedge thread faces 52—52. Further twisting of the handle overcomes the torque of the torsion spring 22 and turns the shaft 20 relative to the tubular member 18. The threads 38 on the shaft and the interior threads on bore 36 in the tubular member cooperate to move the shaft 20 and thereby the clamp foot 16 forwardly. These cooperating threads have a low helix angle and a correspondingly low pitch compared with the helix angle and pitch of the cooperating threads on the tubular member and hub bore, and thus this movement of the shaft occurs with a large mechanical advantage. The reaction pressure of the clamp foot 16 against the work is carried back through the shaft 20 and its threaded coupling 36 with the tubular member, to the trailing thread faces 52 of the tubular member 18 which engage the trailing thread faces 52 in the hub bore.

If $f$ is the minimum expected coefficient of friction, and $\phi$ is the helix angle with respect to a transverse plane, then the angle $\beta$ of the trailing thread face with respect to the longitudinal axis should be less than $\tan^{-1} (\cos \phi \tan(\sin^{-1} (f \cot \beta)))$ so that the mechanical efficiency of the screw thread will be less than 50%. When the helix angle $\phi$ is 50° and the expected minimum coefficient of friction $f$ is .2, the angle $\beta$ of the trailing faces is preferably not more than 10°40' so that those faces will be able to frictionally resist any tendency of the tubular member to slip or unscrew. However, in some applications, such as nutcrackers, when torque is constantly applied during the clamping period, prevention of slipping does not require so small a trailing thread face angle.

The slope of the forward face of the thread should be great enough to facilitate easy sliding of the thread when it bears against that face. It is not necessary that the thread have more than 50% mechanical efficiency in this condition, but it is easy to achieve in threads of steep helix angle, and it contributes to ease of operation for many applications. The face angle of the forward faces is related to ease of machining or fabricating the threaded parts, and acts to some degree to centralize the threaded male part within the nut. The preferred angle is, however, 75° following the practice of standard acme translating threads.

To disengage the clamp, the handle is again urged forward, but twisted in the opposite direction to that used for closing the clamp. This results in unscrewing the shaft to its initial position, untwisting the torsion spring, and then withdrawing of the tubular member.

As should be apparent from the foregoing consideration of the embodiment of the invention presented in FIGURE 1, after the clamp foot has engaged a work piece, shaft 20 can be turned at most through slightly less than one revolution because stop pin 56 engages the stop arm 48 of the spring. The provision of the stop pin, however, is desired to assure positive coaction between shaft 20 and the tubular member 18. At the same time, in some instances, more final adjustment is wanted. Accordingly, the invention provides for replacing the spring by another type of torque transmitting means.

Figure 3:
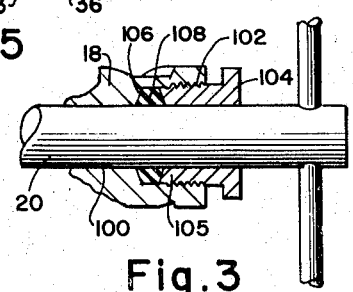
FIGURE 3 is a fragmental detailed side view showing a modified form of torque transmitting means provided by this invention for use in a clamp such as that shown in FIGURE 1.

FIGURE 3 presents a fragmental detailed view of a modified form of tubular member, collar member, and torque transmitting means. By referring to that figure, it will be noted that the bore 34 of the FIGURE 1 construction has been replaced by shaft receiving bore 100 and collar receiving bore 102. Bore 102 is threaded and the threads thereon cooperate with collar 104. A beveled shoulder 106 extends between bore 100 and bore 102, and a friction ring 108 is pressed against that shoulder and the inner end 105 of collar member 104. The friction ring is made of any suitable resilient material, such as, for example, rubber, and serves to transmit torque applied to shaft 20 to tubular member 18. The friction ring construction of FIGURE 3 operates in essentially the same manner as the spring construction of FIGURE 1, however, with the friction ring construction, the shaft 20 can be rotated through more than one turn after the clamping foot has engaged a work piece. As should be apparent, the modification presented in FIGURE 3 can be utilized in various types of clamping devices just as is the case in the spring type construction presented in FIGURE 1.

Figure 4:
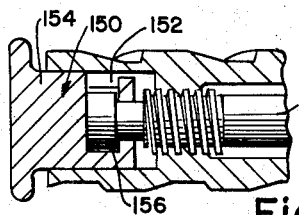
FIGURE 4 is a fragmental detail of a modified form of clamp foot provided by this invention which may be utilized with clamps such as that in FIGURE 1.
Figure 5:
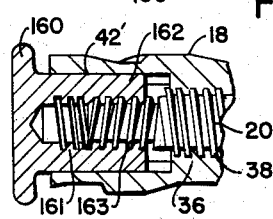
FIGURE 5 is a fragmental detail of another form of clamp foot provided by the invention which may be utilized in a clamp of the type shown in FIGURE 1.

Similarly, the modified forms of clamping foot constructions provided by this invention and shown in FIGURES 4 and 5, can be used in place of the clamp foot construction shown in FIGURE 1. More particularly, FIGURE 4 presents a clamp foot 150 having a T-slot 152 provided in the shank portion 154 thereof, and such foot cooperates with a lug 156 carried at the forward end of shaft 20. This design allows for rotation of shaft 20 independently of the clamp foot 150 just as the bore and lug coupling construction of FIGURE 1 allows for such independent movement, but eliminates having an opening in the front face of the clamp foot.

FIGURE 5 presents still another form of clamp foot construction provided by this invention. By referring to FIGURE 5, it will be noted that clamp foot 160 is provided with a threaded bore 161 extending through the shank portion thereof, and that shaft 20 is provided with a threaded extension 163 that cooperates with the threads on bore 161. It should be noted that the cooperating threads on bore 161 and extension 163 are so cut that rotation of shaft 20 to close the clamp foot on a work piece causes foot 160 to move forward or out of bore 42′ at the front end of tubular member 18. Specifically, if the helical threads on the outer face of tubular member 18 are right hand threads and the threads 38 on the shaft cooperating with those on bore 36 are right hand threads, then the threads on extension 163 and bore 161 will be left hand threads.

Moreover, preferably the shank portion 162 of foot 160 is hexagonal in shape and bore 164 at the forward end of tubular member 18 is correspondingly hexagonal whereby the foot 160 is prevented from turning within the tubular member.

Regardless of the type of torque transmitting means used, and regardless of the type of clamp foot structure incorporated, it should be apparent that after the foot has been clamped on a work piece, and before the tubular member is withdrawn in the hub, the shaft 20 is reset to a position where the threads thereon cooperating with the intermediate bore 36 are in the initial position they assumed prior to tightening of the clamp on the work piece. The resetting is automatic with the FIGURE 1 construction, however, when the modified form of torque transmitting means presented in FIGURE 3 is used, an axial withdrawing force is initially applied to shaft 20 so as to press the trailing thread faces 52 into engagement while the shaft is rotated to reset the shaft relative to the intermediate bore.

After reading the foregoing description, it will be apparent that the objects set forth at the beginning of this specification have been successfully achieved. Accordingly, I claim:

1. A clamping device comprising a frame; a hub carried by said frame, said hub having a bore extending therethrough; a tubular member having first and second axial bores communicating with opposite ends thereof, said first and second bores being separated by a smaller threaded intermediate bore, said tubular member and the bore in said hub having cooperating helical screw threads having forward faces more steeply sloped with respect to the longitudinal axis of said tubular member than their trailing faces in any given longitudinal section of said hub and said tubular member for rapid movement of said tubular member through said bore upon rotation of said tubular member about the longitudinal axis of said tubular member when said tubular member is urged in one direction along said axis and for comparatively resisting movement of said tubular member when said tubular member is urged in a direction opposite to said one direction along said axis; a shaft extending in said first bore in said tubular member, said shaft operatively supported in said first bore and having a threaded portion cooperating with said smaller threaded intermediate bore; a handle means coupled to said shaft for rotating said shaft, resistance sensitive means for transmitting torque exerted on said shaft to said tubular member, said resistance sensitive means becoming ineffective after a predetermined resistance to turning the tubular member has been reached; and a clamping member having a shank portion thereof extending into said second bore and coupled to said shaft, said clamping member movable with said tubular member and said shaft upon movement of both, and with said shaft upon movement thereof alone.

2. A clamping device as defined in claim 1 wherein said means for transmitting torque comprises a helical spring coupled between said collar means and said tubular member.

3. The combination defined in claim 1 wherein said means for transmitting torque from said shaft to said tubular member comprises a friction ring engaging said shaft and said tubular member.

4. The combination defined in claim 1 wherein said clamping member shank portion has a bore extending therethrough and wherein a lug is disposed in said bore in cooperation with said shaft to couple said clamping member.

5. The combination defined in claim 1 wherein said clamping member shank portion extends within the bore of said tubular member, wherein said shank portion has an outer polygonal configuration; wherein the portion of said bore corresponding with said shank portion is cooperatingly polygonal; and wherein said portion has an inner threaded bore and said shaft carries a threaded extension corresponding with the threaded bore in said threaded portion.

References Cited in the file of this patent

UNITED STATES PATENTS

| | | |
|---|---|---|
| 849,968 | Boley et al. | Apr. 9, 1907 |
| 931,833 | Adams | Aug. 24, 1909 |
| 985,682 | Landreth | Feb. 28, 1911 |
| 1,017,131 | Buchanan | Feb. 13, 1912 |
| 1,288,612 | Kaelin | Dec. 24, 1918 |
| 1,345,665 | Cuendet | July 6, 1920 |
| 2,133,892 | Gelinski | Oct. 18, 1938 |
| 2,472,658 | Gilbert | June 7, 1949 |

FOREIGN PATENTS

| | | |
|---|---|---|
| 30,056 | France | Jan. 26, 1926 |
| | (Addition to No. 583,155) | |
| 546,518 | Great Britain | July 16, 1942 |